US 12,307,192 B2

(12) United States Patent
Gu et al.

(10) Patent No.: US 12,307,192 B2
(45) Date of Patent: May 20, 2025

(54) ARRANGING WORKBOOK ELEMENTS USING A DYNAMIC GRID LAYOUT

(71) Applicant: SIGMA COMPUTING, INC., San Francisco, CA (US)

(72) Inventors: Simin Gu, Burlingame, CA (US); Anton Lunev, Mountain View, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/326,723

(22) Filed: May 31, 2023

(65) Prior Publication Data
US 2024/0370643 A1 Nov. 7, 2024

Related U.S. Application Data (60) Provisional application No. 63/499,331, filed on May 1, 2023.

(51) Int. Cl.
*G06F 40/18* (2020.01)
(52) U.S. Cl.
CPC .................... *G06F 40/18* (2020.01)
(58) Field of Classification Search
CPC .................................................... G06F 40/18
See application file for complete search history.

(56) References Cited

U.S. PATENT DOCUMENTS

| 6,370,673 | B1* | 4/2002 | Hill ....................... G06F 30/392 |
| | | | 716/123 |
| 10,769,346 | B1* | 9/2020 | Yu ........................... G06F 3/0486 |
| 2005/0068583 | A1* | 3/2005 | Gutkowski ........... H04N 1/3877 |
| | | | 358/1.18 |
| 2014/0372858 | A1 | 12/2014 | Campbell et al. |
| 2016/0041698 | A1* | 2/2016 | Tkach .................... G06F 3/0482 |
| | | | 715/765 |
| 2017/0060821 | A1 | 3/2017 | Rucine et al. |
| 2020/0379631 | A1* | 12/2020 | Karlsson .............. G06F 3/04845 |
| 2021/0357367 | A1* | 11/2021 | Yazganarikan ....... G06F 16/168 |
| 2023/0146478 | A1* | 5/2023 | You ........................ G06F 3/0482 |
| | | | 715/764 |

OTHER PUBLICATIONS

IT Magics, How to insert image in excel cell, published Sep. 5, 2022 https://www.youtube.com/watch?v=W23s0bPBVnM pp. 1-3 (Year: 2022).*
International Search Report and Written Opinion, PCT/US2024/025634, Jul. 18, 2024, 8 pages.

* cited by examiner

*Primary Examiner* — Andrey Belousov (57) ABSTRACT

Arranging workbook elements using a dynamic grid layout including presenting, by a workbook client on a client computing system, a workbook comprising an element grid for placing workbook elements, wherein the element grid comprises a plurality of grid columns and a plurality of grid rows; receiving, by the workbook client at a particular location within the element grid, a first workbook element for placement on the element grid, wherein the particular location is between two lines of the element grid; and moving, by the workbook client, the first workbook element to align with a nearest line of the two lines of the element grid.

18 Claims, 9 Drawing Sheets

ARRANGING WORKBOOK ELEMENTS USING A DYNAMIC GRID LAYOUT

BACKGROUND

Field of the Invention

The field of the invention is data processing, or, more specifically, methods, apparatus, and products for arranging workbook elements using a dynamic grid layout.

Description Of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for arranging workbook elements using a dynamic grid layout including presenting, by a workbook client on a client computing system, a workbook comprising an element grid for placing workbook elements, wherein the element grid comprises a plurality of grid columns and a plurality of grid rows; receiving, by the workbook client at a particular location within the element grid, a first workbook element for placement on the element grid, wherein the particular location is between two lines of the element grid; and moving, by the workbook client, the first workbook element to align with a nearest line of the two lines of the element grid.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
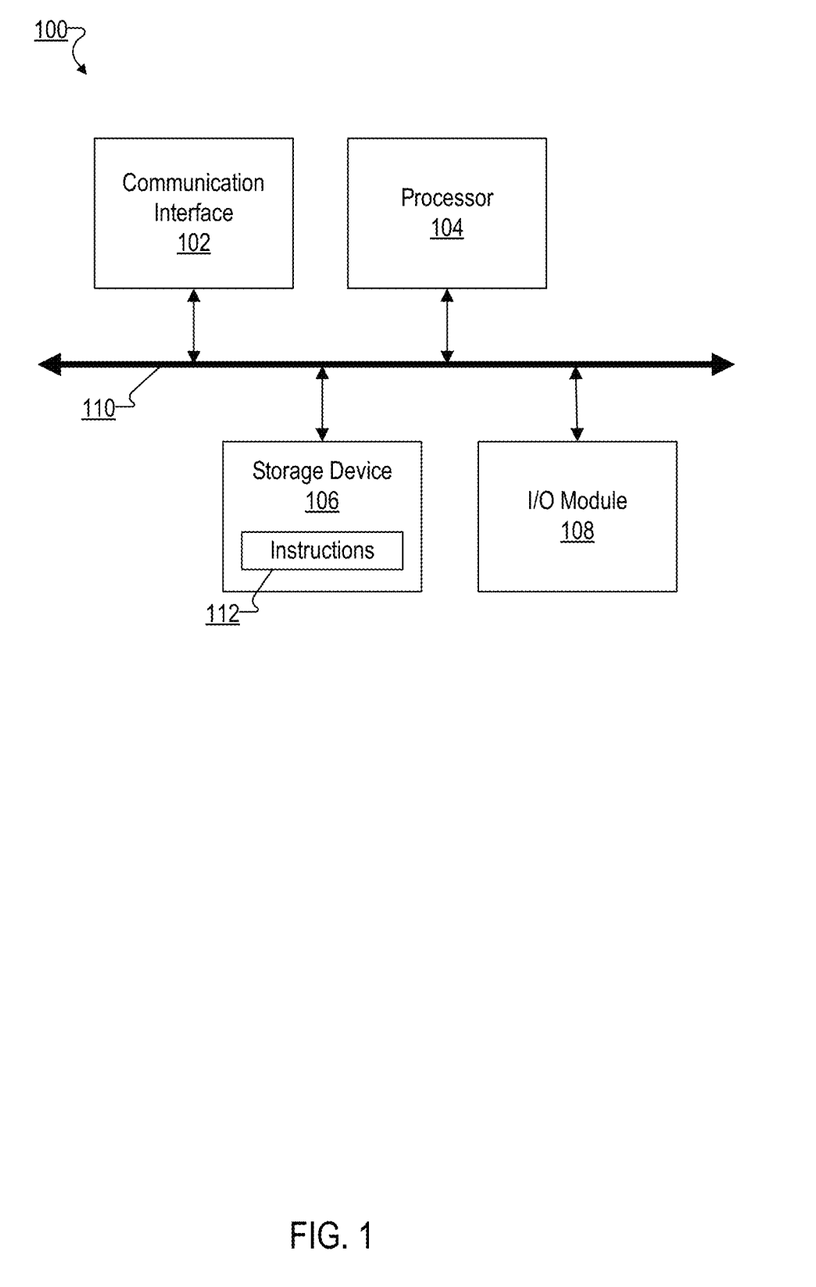
FIG. 1 sets forth a block diagram of an example system configured for arranging workbook elements using a dynamic grid layout according to embodiments of the present invention.

Example methods, apparatus, and products for arranging workbook elements using a dynamic grid layout in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
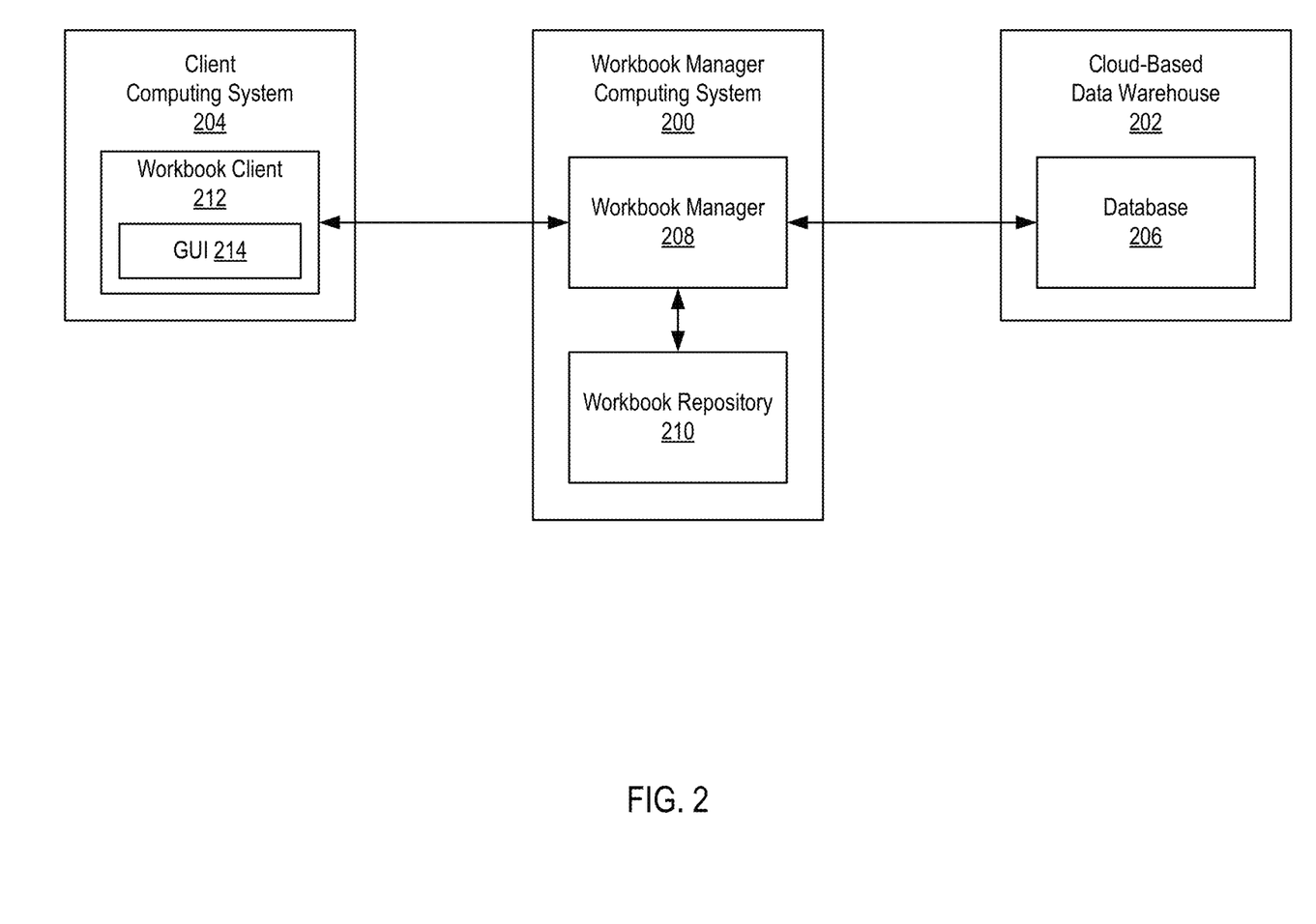
FIG. 2 sets forth a block diagram of an example system configured for arranging workbook elements using a dynamic grid layout according to embodiments of the present invention.

For further explanation, FIG. 2 illustrates a block diagram depicting an exemplary system for arranging workbook elements using a dynamic grid layout according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
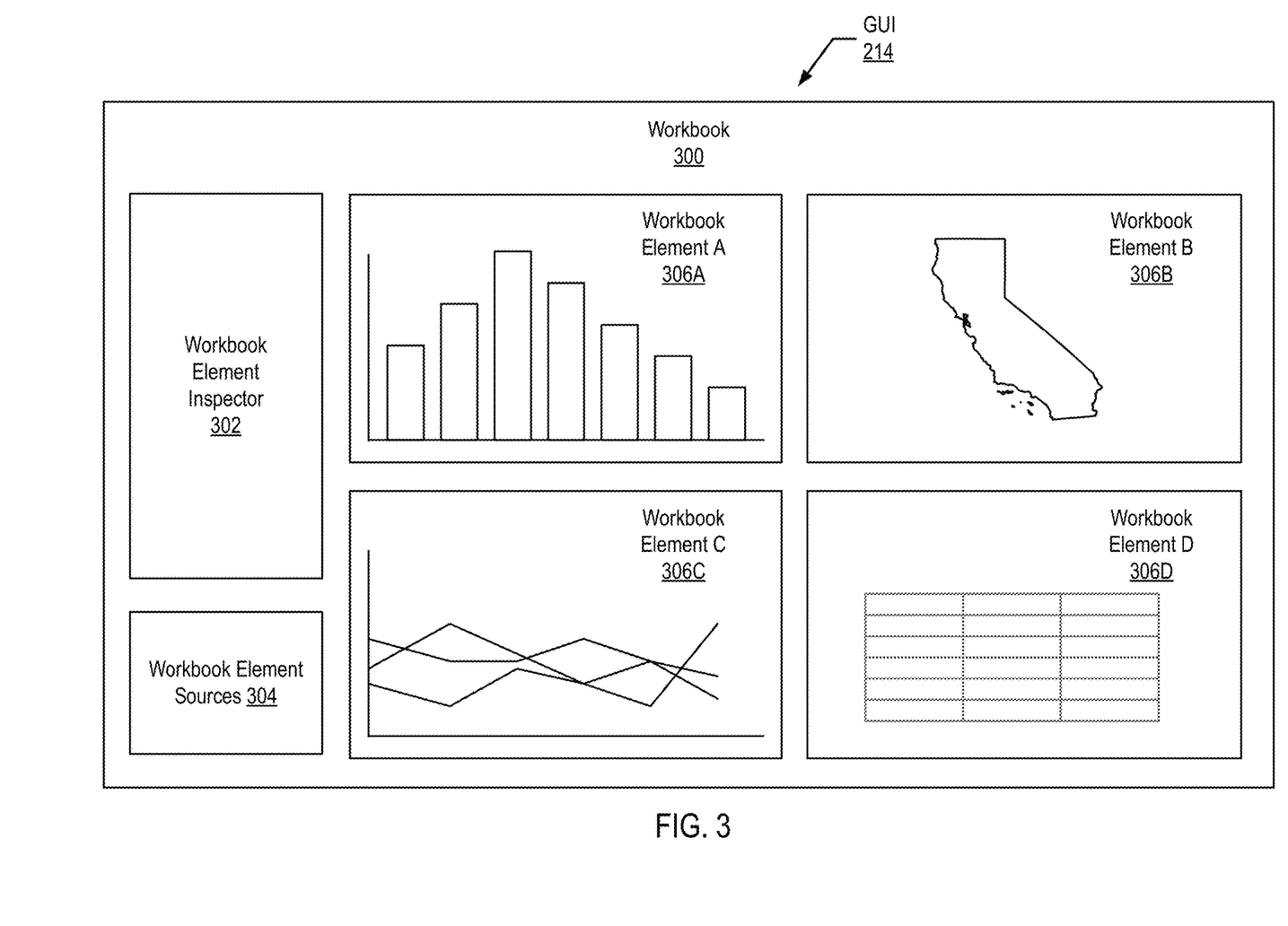
FIG. 3 sets forth a diagram of an example graphical user interface configured for arranging workbook elements using a dynamic grid layout according to embodiments of the present invention.

FIG. 3 shows an exemplary GUI for arranging workbook elements using a dynamic grid layout according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4A:
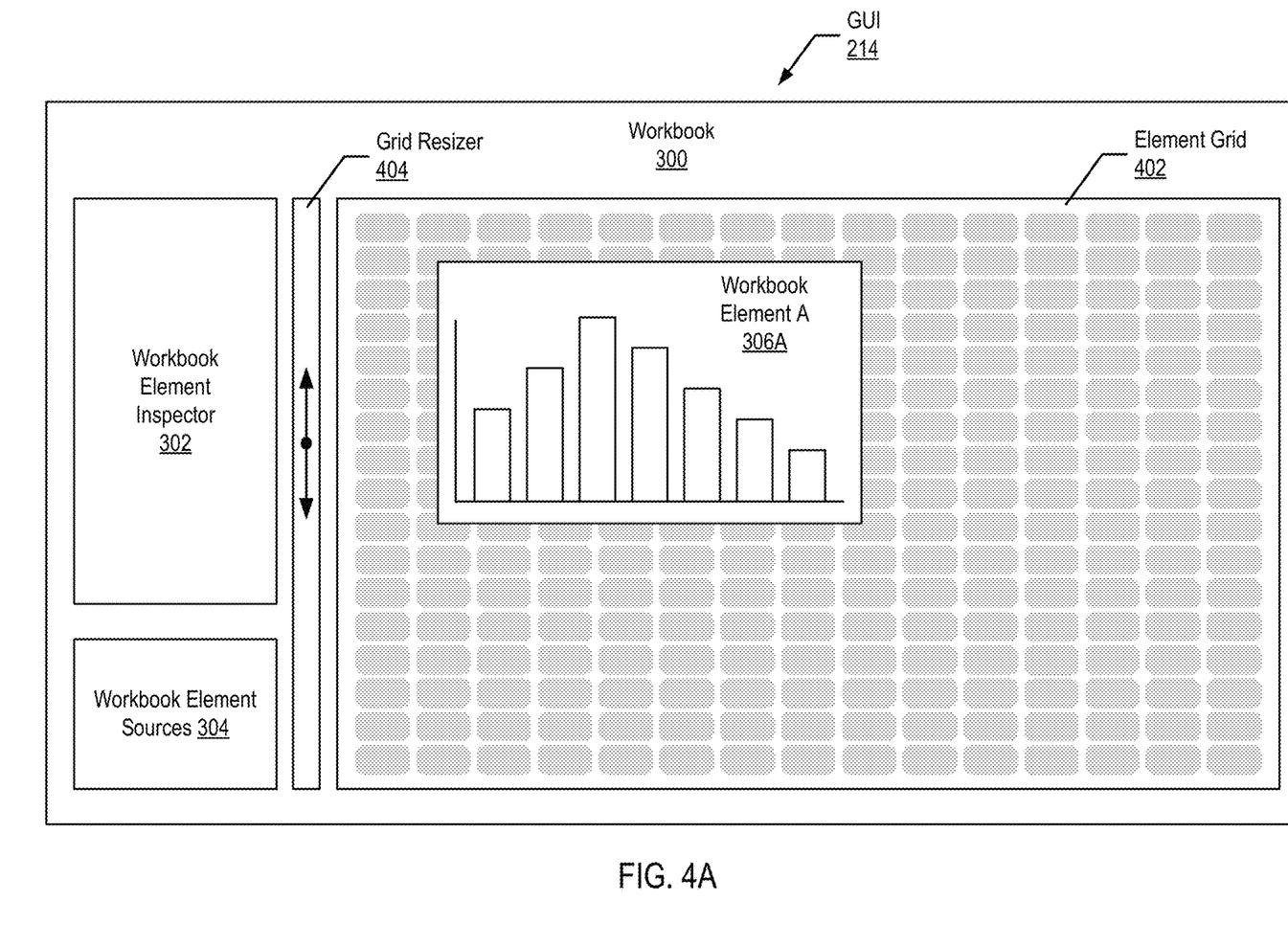
FIG. 4A sets forth a diagram of an example graphical user interface configured for arranging workbook elements using a dynamic grid layout according to embodiments of the present invention.
Figure 4B:
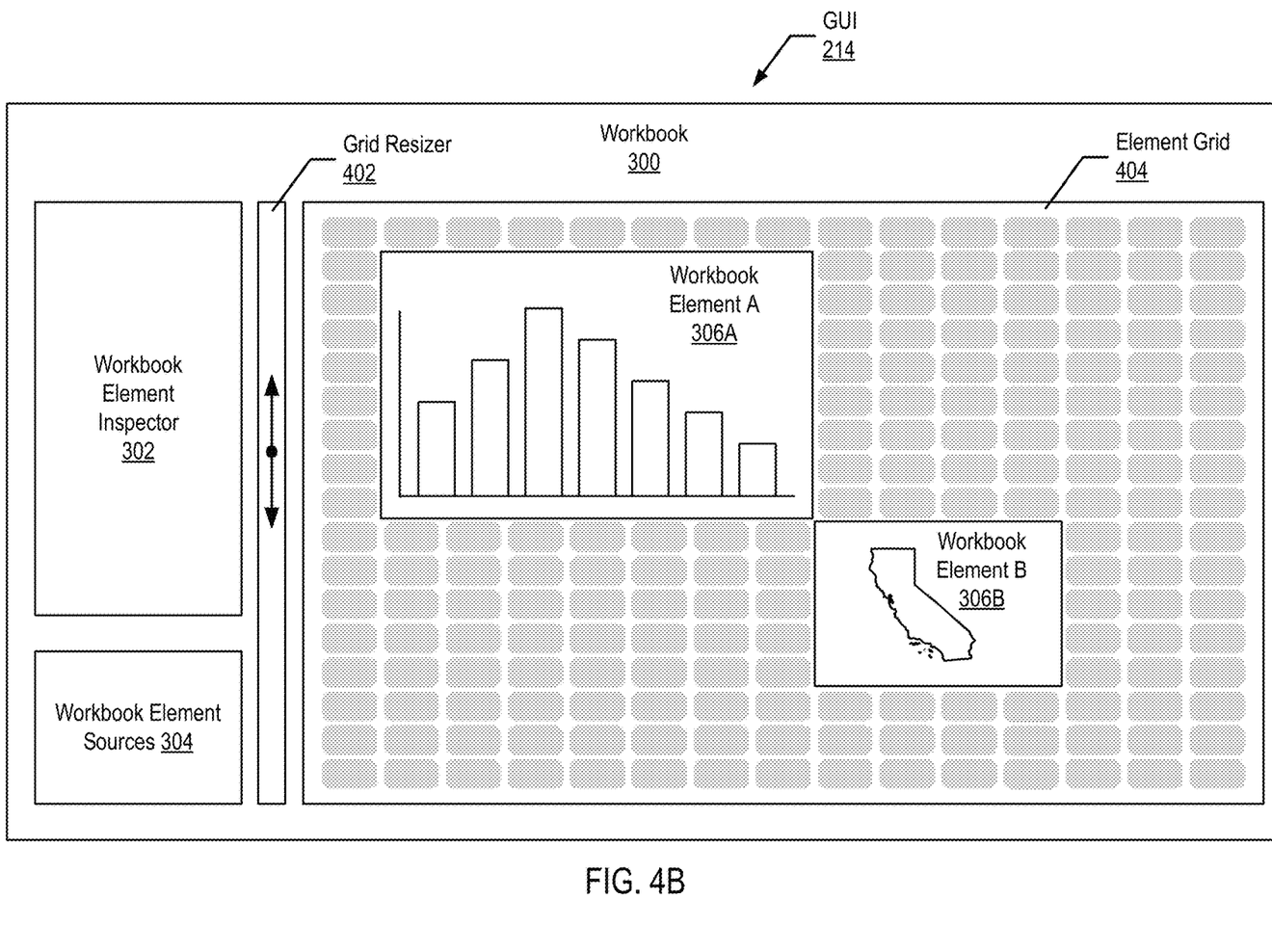
FIG. 4B sets forth a diagram of an example graphical user interface configured for arranging workbook elements using a dynamic grid layout according to embodiments of the present invention.
Figure 4C:
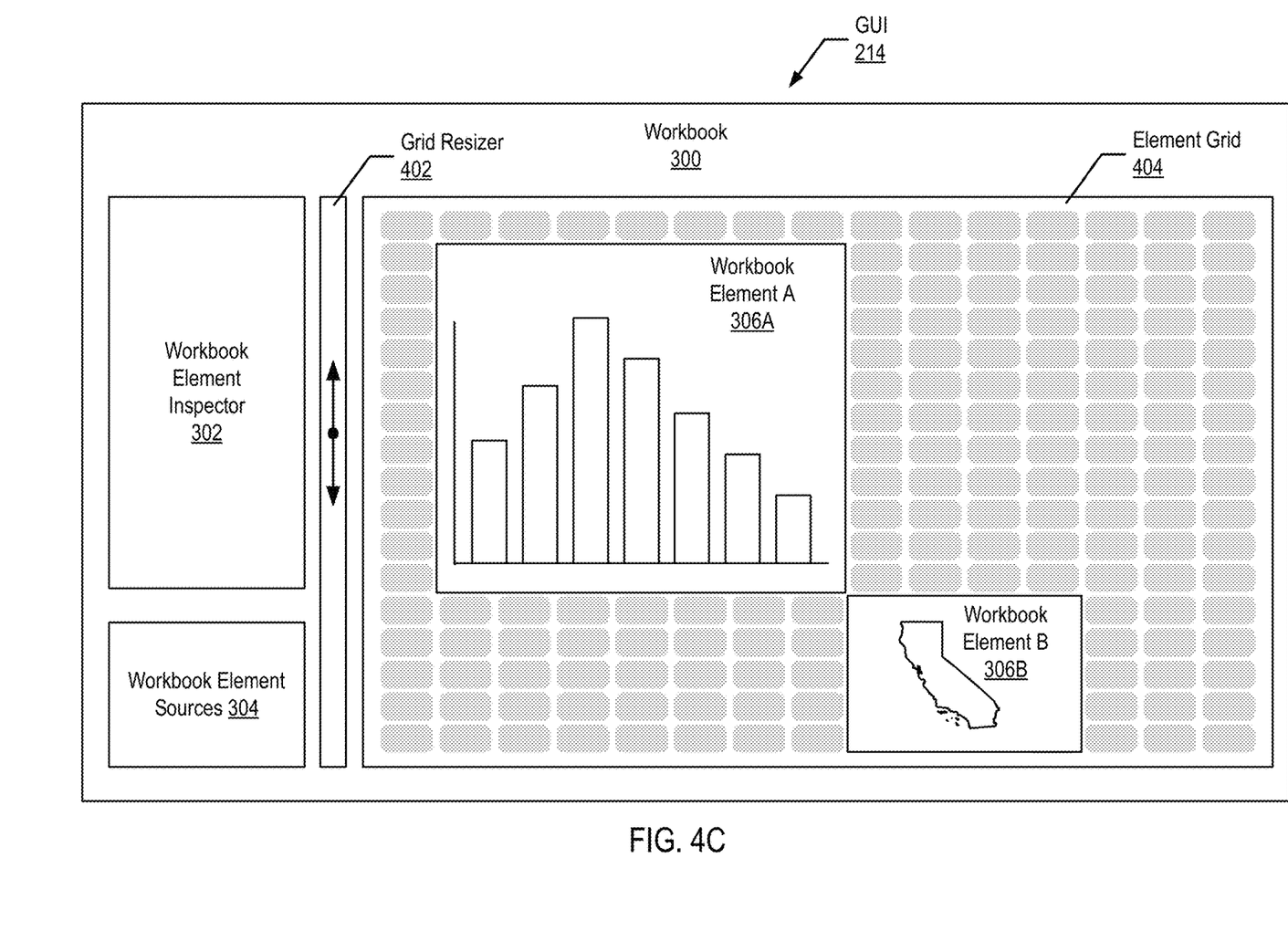
FIG. 4C sets forth a diagram of an example graphical user interface configured for arranging workbook elements using a dynamic grid layout according to embodiments of the present invention.

FIG. 4A shows an exemplary GUI for arranging workbook elements using a dynamic grid layout according to embodiments of the present invention. In contrast to FIG. 3, FIG. 4 shows an element grid 402 and a grid resizer 404. As shown in FIG. 4A, the exemplary GUI 214 also includes workbook element A 306A having been placed within the element grid 402. The element grid 402 is a group of grid rows and grid columns that organize the placement of workbook elements (such as workbook element A 306A) within the workbook 300. In FIGS. 4A, 4B, and 4C, the element grid 402 is presented as the white space between shaded, rounded rectangles. The element grid 402 may be visible to a user only during the placement or movement of workbook elements or during interactions with the grid resizer 404. Alternatively, the element grid 402 may be visible during the entire editing period and a user option may be provided that allows the user to keep the element grid visible. Workbook elements within the element grid 402 may be grouped together to apply edits to the workbook elements as a group. Workbook elements, as a group, may be aligned vertically or horizontally, resized together, or removed as a group. Further, cosmetic changes may be applied to each workbook elements in the group.

As shown in FIG. 4A, workbook element A 306A has been placed on the element grid 402. Specifically, workbook element A 306A has been placed between grid lines. Placing workbook element A 306A on the element grid 402 may have been carried out by dragging and dropping a workbook element A 306A from the workbook element inspector 302.

FIG. 4B shows an additional exemplary GUI for arranging workbook elements using a dynamic grid layout according to embodiments of the present invention. Specifically, FIG. 4B, shows the GUI 214 after the workbook client has repositioned workbook element A 306A. As shown in FIG. 4B, workbook element A 306A has been repositioned to align with the nearest lines of the element grid 404. FIG. 4B also shows the addition of workbook element B 306B to the element grid 404.

FIG. 4C shows an additional exemplary GUI for arranging workbook elements using a dynamic grid layout according to embodiments of the present invention. Specifically, FIG. 4C. shows the GUI 214 after a user has utilized the grid resizer 402 in FIG. 4B. The grid resizer 402 is a tool within the GUI 214 used to increase the number of rows at the point selected. As shown in FIG. 4C, the grid resizer 402 has been used to increase the number of grid rows at a point horizontally adjacent to workbook element A 306A. Because the user selected a point on the grid resizer 402 between the top of workbook element A 306A and the bottom of workbook element A 306A, increasing the number of grid rows also has the effect of increasing the vertical size of the workbook element A 306A. In the example of FIG. 4C, had the user selected a point on the grid resizer 402 vertically above or below workbook element A 306A, workbook element A 306A would have remained the same size while the number of grid rows increased. As shown in FIG. 4C, workbook element B 306B remains in the same location relative to workbook element A 306A. The element grid 404 enables a variety of workbook element arrangement processes, including those described in FIGS. 5, 6, and 7 below.

Figure 5:
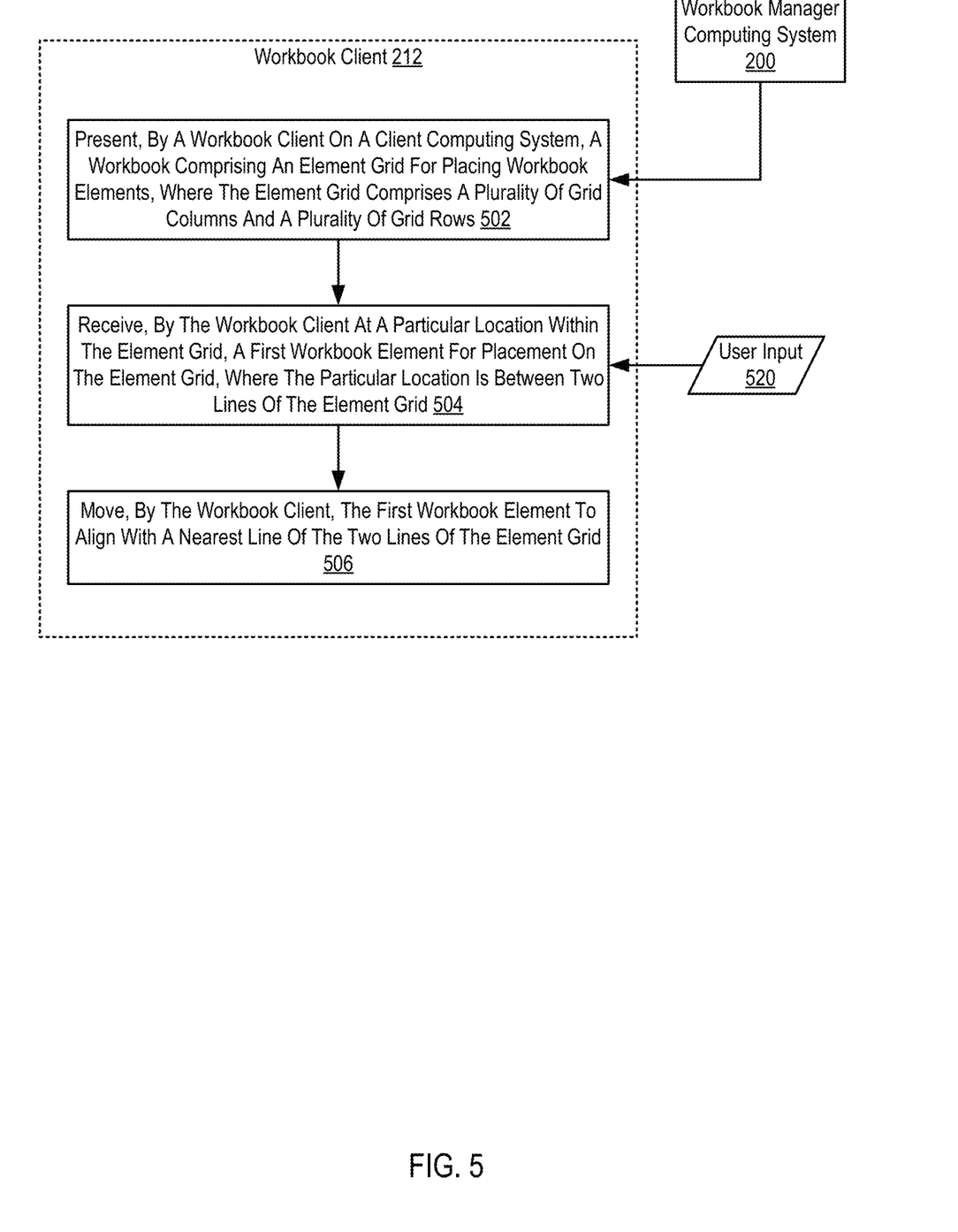
FIG. 5 sets forth a flow chart illustrating an exemplary method for arranging workbook elements using a dynamic grid layout according to embodiments of the present invention.

For further explanation, FIG. 5 sets forth a flow chart illustrating an exemplary method for arranging workbook elements using a dynamic grid layout according to embodiments of the present invention. The method of FIG. 5 describes the process presented in FIGS. 4A and 4B. The method of FIG. 5 includes presenting 502, by a workbook client 212 on a client computing system, a workbook comprising an element grid for placing workbook elements, wherein the element grid comprises a plurality of grid columns and a plurality of grid rows. Presenting 502 the workbook comprising an element grid for placing workbook elements may be carried out by the workbook client 212 communicating with the workbook manager to creating a new workbook or retrieving an existing workbook from the workbook repository. Each workbook may be associated with at least one cloud-based data warehouse and present data from that cloud-based data warehouse. The workbook may include zero or more existing workbook elements.

The method of FIG. 5 also includes receiving 504, by the workbook client 212 at a particular location within the element grid, a first workbook element for placement on the element grid, wherein the particular location is between two lines of the element grid. Receiving 504 the first workbook element for placement on the element grid may be carried out by a user indicating (e.g., via the workbook element inspector) a desire to create a new workbook element at the particular location. Receiving 504 the first workbook element for placement on the element grid may also be carried out by a user moving an existing workbook element to the particular location.

The method of FIG. 5 also includes moving 506, by the workbook client 212, the first workbook element to align with a nearest line of the two lines of the element grid. Moving 506, by the workbook client 212, the first workbook element to align with a nearest line of the two lines of the element grid may be carried out by the workbook client moving the workbook element from the particular location to the new location that aligns with the nearest line of the two lines of the element grid. The workbook element is made to align with the nearest of the two lines of the element grid by placing an edge of the workbook element in line with one of the nearest two lines of the element grid. The line may be a line of the grid column or grid row.

Subsequently, the workbook client may detect that a subset of the plurality of grid rows above the first workbook element are empty; and present an option to remove the subset of the plurality of grid rows. Detecting that a subset of the plurality of grid rows above the first workbook element are empty may be carried out by the workbook client receiving an indication that a workbook element has been moved or deleted leaving the subset of the plurality of grid rows empty. Presenting an option to remove the subset of the plurality of grid rows may be carried out by displaying an interactive GUI element allowing a user to indicate a desire to remove the subset of the plurality of grid rows. In response to receiving input, the plurality of grid rows may then be removed, and the remaining grid rows and workbook elements may then be moved upward.

Similarly, the workbook client may also detect that a subset of the plurality of grid columns adjacent to the first workbook element are empty; and present an option to remove the subset of the plurality of grid columns. Detecting that a subset of the plurality of grid columns adjacent to the first workbook element are empty may be carried out by the workbook client receiving an indication that a workbook element has been moved or deleted leaving the subset of the plurality of grid rows empty. Presenting an option to remove the subset of the plurality of grid columns may be carried out by displaying an interactive GUI element allowing a user to indicate a desire to remove the subset of the plurality of grid rows. In response to receiving input, the plurality of grid rows may then be removed, and the remaining grid rows and workbook elements may then be moved laterally.

The element grid may also enable the workbook to maintain the size of workbook element across different GUI dimensions. Specifically, in response to detecting that a size of the workbook has changed, the workbook client 212 may maintain a vertical height of the first workbook element. The element grid may be untethered from the dimensions of the GUI or the web browser presenting the GUI. Maintaining the vertical height of the first workbook element may be carried out by anchoring the first workbook element to a set number of pixels from the top GUI edge and/or the left GUI edge. Expanding the size of the GUI in any direction may not affect the size of the first workbook element.

The above steps improve the operation of the computer system by enhancing the presentation options for a workbook and providing a mechanism to simplify powerful visual changes for users. This is accomplished by presenting an element grid, moving workbook elements to align with the grid, and resizing the workbook elements along with the grid among other features.

Figure 6:
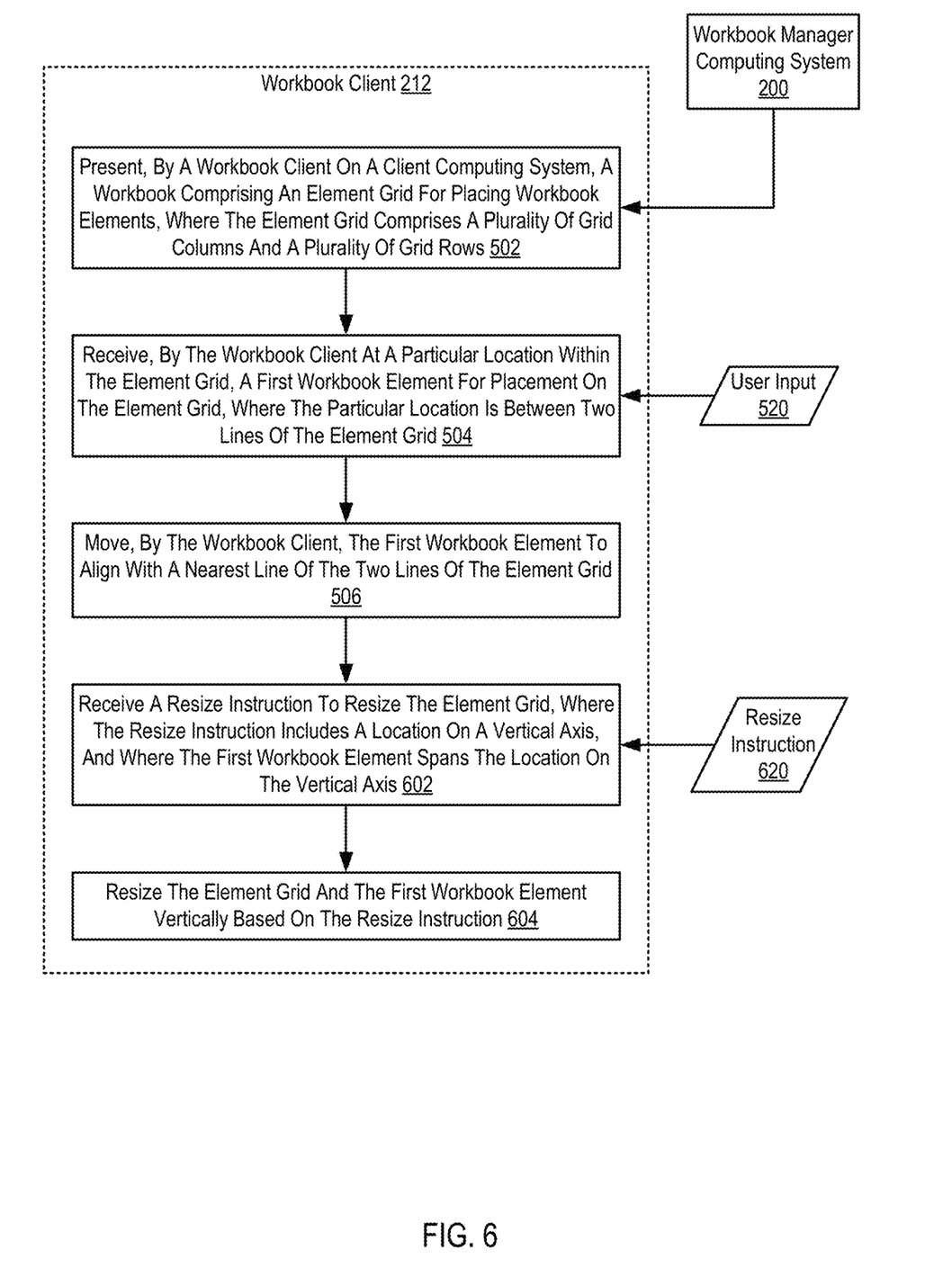
FIG. 6 sets forth a flow chart illustrating an exemplary method for arranging workbook elements using a dynamic grid layout according to embodiments of the present invention.

For further explanation, FIG. 6 sets forth a flow chart illustrating a further exemplary method for arranging workbook elements using a dynamic grid layout according to embodiments of the present invention that includes presenting 502, by a workbook client 212 on a client computing system, a workbook comprising an element grid for placing workbook elements, wherein the element grid comprises a plurality of grid columns and a plurality of grid rows; receiving 504, by the workbook client 212 at a particular location within the element grid, a first workbook element for placement on the element grid, wherein the particular location is between two lines of the element grid; and moving 506, by the workbook client 212, the first workbook element to align with a nearest line of the two lines of the element grid.

The method of FIG. 6 differs from the method of FIG. 5, however, in that the method of FIG. 6 further includes receiving 602 a resize instruction 620 to resize the element grid, wherein the resize instruction 620 includes a location on a vertical axis, and wherein the first workbook element spans the location on the vertical axis; and resizing 604 the element grid and the first workbook element vertically based on the resize instruction. The method of FIG. 6 describes the process presented in FIGS. 4B and 4C.

Receiving 602 the resize instruction 620 to resize the element grid may be carried out by detecting that a user has interacted with the grid resizer tool within the GUI and indicated, via the grid resizer tool, a desire to resize the element grid. The user may click and drag the grid resizer tool in a vertical direction, with one direction indicating a desire to increase the number of grid rows and another direction indicating a desire to decrease the number of grid rows.

Resizing 604 the element grid and the first workbook element vertically based on the resize instruction may be carried out by increasing or decreasing the number of grid rows. For example, if a user drags the grid resizer toward the top of the GUI, the workbook client decreases the number of grid rows. Although the same number of grid rows will be displayed, workbook elements will be moved up or have the vertical length of the workbook element decreased (i.e., shrunk). As another example, if a user drags the grid resizer toward the bottom of the GUI, the workbook client increases the number of grid rows. Again, although the same number of grid rows will be displayed, workbook elements will be moved down or have the vertical length of the workbook element increased (i.e., stretched).

Some workbook elements may have a fixed minimum area. For example, a workbook element that is a text box may have an absolute font size that does not change with the size of the workbook element. Such a text box may be used so that no text within the workbook element is hidden (e.g., in an unseen scrollable portion of the workbook element). For such elements, in response to a resizing of the workbook and/or GUI, the workbook client may increase the distance between the grid rows upon which the workbook element has been placed without changing the distance between the remaining grid rows of the element grid. Consequently, other workbook elements occupying the same grid rows are also lengthened vertically as the distance between the grid rows increases. In that way, alignment is maintained between text box workbook elements and other workbook elements upon the same grid rows.

Figure 7:
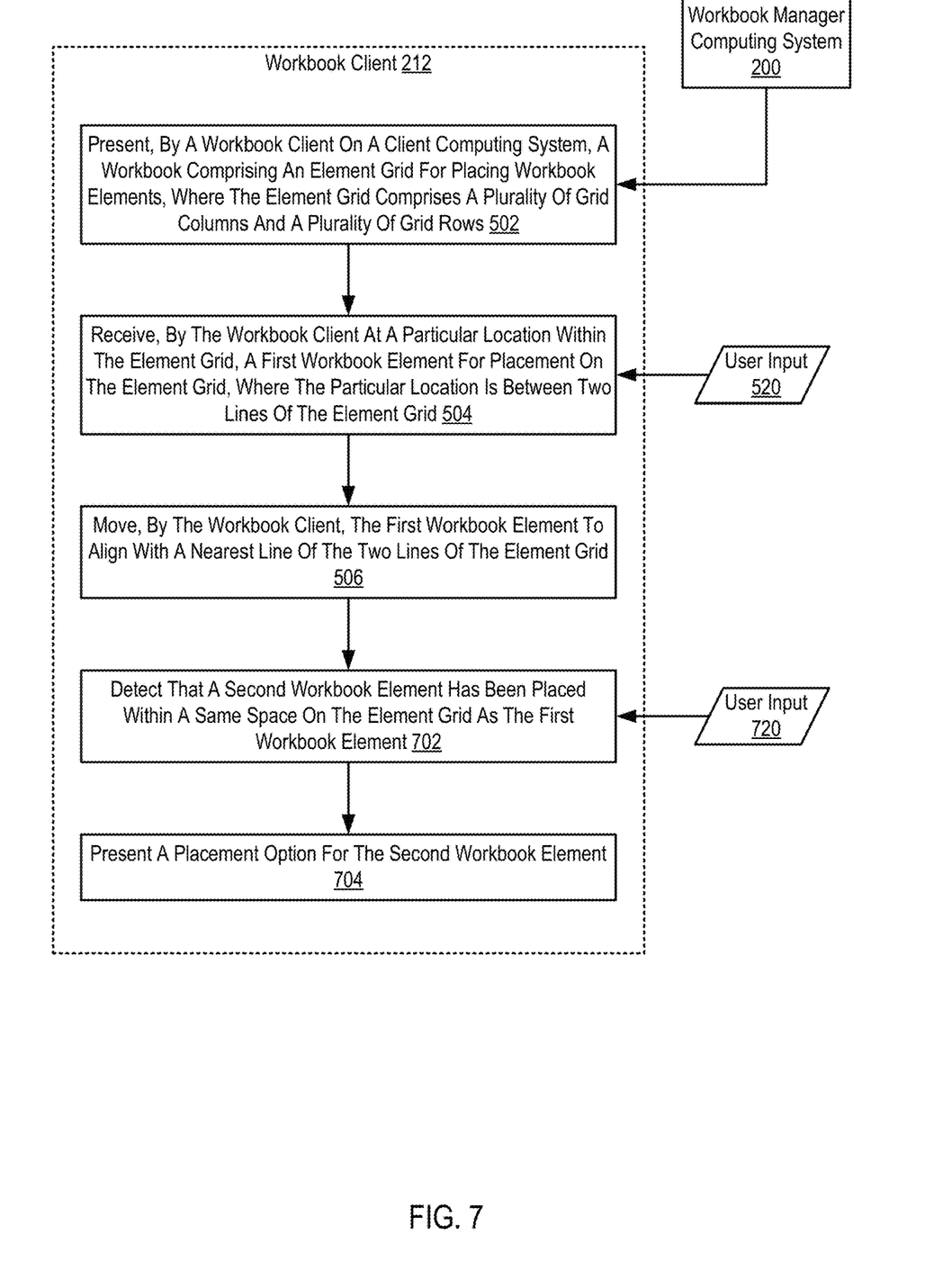
FIG. 7 sets forth a flow chart illustrating an exemplary method for arranging workbook elements using a dynamic grid layout according to embodiments of the present invention.

For further explanation, FIG. 7 sets forth a flow chart illustrating a further exemplary method for arranging workbook elements using a dynamic grid layout according to embodiments of the present invention that includes presenting 502, by a workbook client 212 on a client computing system, a workbook comprising an element grid for placing workbook elements, wherein the element grid comprises a plurality of grid columns and a plurality of grid rows; receiving 504, by the workbook client 212 at a particular location within the element grid, a first workbook element for placement on the element grid, wherein the particular location is between two lines of the element grid; and moving 506, by the workbook client 212, the first workbook element to align with a nearest line of the two lines of the element grid.

The method of FIG. 7 differs from the method of FIG. 5, however, in that the method of FIG. 6 further includes detecting 702 that a second workbook element has been placed within a same space on the element grid as the first workbook element; and presenting 704 a placement option for the second workbook element. Detecting 702 that a second workbook element has been placed within a same space on the element grid as the first workbook element may be carried out by detecting that a user has dragged the second workbook element to a point within the boarders of the first workbook element. Presenting 704 a placement option for the second workbook element may be carried out by displaying an interactive GUI element allowing a user to select among a group of options for placement of the second workbook element. The options presented may include an option to split the space on the element grid between the first workbook element and the second workbook element, an option to replace the first workbook element with the second workbook element, and an option to insert the second workbook element to a location adjacent to the first workbook element.

Following the presentation 704 of the placement option, the method may further include receiving, in response to presenting the placement option, an instruction to split the space on the element grid between the first workbook element and the second workbook element; resizing the first workbook element to occupy a first half of the space on the element grid; and placing the second workbook element to occupy a second half of the space on the element grid.

Receiving, in response to presenting the placement option, an instruction to split the space on the element grid between the first workbook element and the second workbook element may be carried out by detecting that the user has interacted with the corresponding option presented. Resizing the first workbook element to occupy a first half of the space on the element grid may be carried out by changing the dimensions of the first workbook element such that either the vertical or horizontal length of the first workbook element is approximately one half of the existing length. Placing the second workbook element to occupy a second half of the space on the element grid may be carried out by sizing the second workbook element to approximately the same size as the first workbook element and presenting the second workbook element in the unoccupied second half of the space previously occupied by the first workbook element.

Following the presentation 704 of the placement option, the method may instead include receiving, in response to presenting the placement option, an instruction to replace the first workbook element with the second workbook element; and replacing the first workbook element in the space on the element grid with the second workbook element. Receiving, in response to presenting the placement option, an instruction to replace the first workbook element with the second workbook element may be carried out by detecting that the user has interacted with the corresponding option presented. Replacing the first workbook element in the space on the element grid with the second workbook element may be carried out by removing the first workbook element from the element grid and presenting the second workbook element at the same location and with the similar dimensions within the element grid.

Following the presentation 704 of the placement option, the method may instead include receiving, in response to presenting the placement option, an instruction to insert the second workbook element to a location adjacent to the first workbook element; and placing the second workbook element adjacent to the first workbook element. Receiving, in response to presenting the placement option, an instruction to insert the second workbook element to a location adjacent to the first workbook element may be carried out by detecting that the user has interacted with the corresponding option presented. Placing the second workbook element adjacent to the first workbook element may be carried out by determining an edge of the first workbook element closest to the point at which the second workbook element was dragged and released. Once the edge is determined, the workbook client may then expand the element grid to accommodate the placement of the second workbook element adjacent to the first workbook element along the determined edge.

In view of the explanations set forth above, readers will recognize that the benefits of arranging workbook elements using a dynamic grid layout according to embodiments of the present invention include:

Improving the operation of the computer system by enhancing the presentation options for a workbook, increasing system utility.

Improving the operation of the computer system by providing a mechanism to simplify powerful visual changes for users, increasing system utility.

Exemplary embodiments of the present invention are described largely in the context of a fully functional computer system for arranging workbook elements using a dynamic grid layout. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for arranging workbook elements using a dynamic grid layout, the method comprising:
   presenting, by a workbook client on a client computing system, a workbook comprising an element grid for placing workbook elements, wherein the element grid comprises a plurality of grid columns and a number of grid rows;
   receiving, by the workbook client at a particular location within the element grid, a first workbook element for placement on the element grid, wherein the particular location is between two lines of the element grid;
   moving, by the workbook client, the first workbook element to align with a nearest line of the two lines of the element grid;
   receiving a resize instruction to resize the element grid, wherein the resize instruction includes a location on a vertical axis, wherein the first workbook element spans the location on the vertical axis, and wherein a second workbook element within the workbook does not span the location on the vertical axis; and
   resizing, vertically based on the resize instruction, the element grid and the first workbook element without resizing the second workbook element by changing the number of grid rows.

2. The method of claim 1, further comprising:
   detecting that a third workbook element has been placed within a same space on the element grid as the first workbook element; and
   presenting a placement option for the third workbook element.

3. The method of claim 2, further comprising:
   receiving, in response to presenting the placement option, an instruction to split the space on the element grid between the first workbook element and the third workbook element;
   resizing the first workbook element to occupy a first half of the space on the element grid; and
   placing the third workbook element to occupy a second half of the space on the element grid.

4. The method of claim 2, further comprising:
   receiving, in response to presenting the placement option, an instruction to replace the first workbook element with the third workbook element; and
   replacing the first workbook element in the space on the element grid with the third workbook element.

5. The method of claim 2, further comprising:
   receiving, in response to presenting the placement option, an instruction to insert the third workbook element to a location adjacent to the first workbook element; and
   placing the third workbook element adjacent to the first workbook element.

6. The method of claim 1, further comprising:
   detecting that a subset of the plurality of grid rows above the first workbook element are empty; and
   presenting an option to remove the subset of the plurality of grid rows.

7. The method of claim 1, further comprising:
   detecting that a subset of the plurality of grid columns adjacent to the first workbook element are empty; and
   presenting an option to remove the subset of the plurality of grid columns.

8. The method of claim 1, further comprising:
   maintaining a vertical height of the first workbook element in response to detecting that a size of the workbook has changed.

9. The method of claim 1, wherein the first workbook element presents a dataset from a cloud-based data warehouse.

10. An apparatus for arranging workbook elements using a dynamic grid layout, the apparatus comprising a computer processor, a computer memory operatively coupled to the computer processor, the computer memory having disposed within it computer program instructions that, when executed by the computer processor, cause the apparatus to carry out the steps of:
    presenting, by a workbook client on a client computing system, a workbook comprising an element grid for placing workbook elements, wherein the element grid comprises a plurality of grid columns and a number of grid rows;
    receiving, by the workbook client at a particular location within the element grid, a first workbook element for placement on the element grid, wherein the particular location is between two lines of the element grid;
    moving, by the workbook client, the first workbook element to align with a nearest line of the two lines of the element grid;

receiving a resize instruction to resize the element grid, wherein the resize instruction includes a location on a vertical axis, wherein the first workbook element spans the location on the vertical axis, and wherein a second workbook element within the workbook does not span the location on the vertical axis; and resizing, vertically based on the resize instruction, the element grid and the first workbook element without resizing the second workbook element by changing the number of grid rows.

11. The apparatus of claim 10, wherein the computer program instructions further cause the apparatus to carry out the steps of:

detecting that a third workbook element has been placed within a same space on the element grid as the first workbook element; and presenting a placement option for the third workbook element.

12. The apparatus of claim 11, wherein the computer program instructions further cause the apparatus to carry out the steps of:

receiving, in response to presenting the placement option, an instruction to split the space on the element grid between the first workbook element and the third workbook element;

resizing the first workbook element to occupy a first half of the space on the element grid; and placing the second workbook element to occupy a third half of the space on the element grid.

13. The apparatus of claim 11, wherein the computer program instructions further cause the apparatus to carry out the steps of:

receiving, in response to presenting the placement option, an instruction to replace the first workbook element with the third workbook element; and replacing the first workbook element in the space on the element grid with the third workbook element.

14. The apparatus of claim 11, wherein the computer program instructions further cause the apparatus to carry out the steps of:

receiving, in response to presenting the placement option, an instruction to insert the third workbook element to a location adjacent to the first workbook element; and placing the third workbook element adjacent to the first workbook element.

15. The apparatus of claim 10, wherein the computer program instructions further cause the apparatus to carry out the steps of:

detecting that a subset of the plurality of grid rows above the first workbook element are empty; and presenting an option to remove the subset of the plurality of grid rows.

16. The apparatus of claim 10, wherein the computer program instructions further cause the apparatus to carry out the steps of:

detecting that a subset of the plurality of grid columns adjacent to the first workbook element are empty; and presenting an option to remove the subset of the plurality of grid columns.

17. The apparatus of claim 10, wherein the computer program instructions further cause the apparatus to carry out the steps of:

maintaining a vertical height of the first workbook element in response to detecting that a size of the workbook has changed.

18. A computer program product for arranging workbook elements using a dynamic grid layout, the computer program product disposed upon a non-transitory computer readable medium, the computer program product comprising computer program instructions that, when executed, cause a computer to carry out the steps of:

presenting, by a workbook client on a client computing system, a workbook comprising an element grid for placing workbook elements, wherein the element grid comprises a plurality of grid columns and a number of grid rows;

receiving, by the workbook client at a particular location within the element grid, a first workbook element for placement on the element grid, wherein the particular location is between two lines of the element grid;

moving, by the workbook client, the first workbook element to align with a nearest line of the two lines of the element grid;

receiving a resize instruction to resize the element grid, wherein the resize instruction includes a location on a vertical axis, wherein the first workbook element spans the location on the vertical axis, and wherein a second workbook element within the workbook does not span the location on the vertical axis; and resizing, vertically based on the resize instruction, the element grid and the first workbook element without resizing the second workbook element by changing the number of grid rows.

* * * * *